United States Patent [19]

Mauceri

[11] 4,026,794

[45] May 31, 1977

[54] PROCESS FOR RESOLVING OIL-IN-WATER EMULSIONS BY THE USE OF A CATIONIC POLYMER AND THE WATER SOLUBLE SALT OF AN AMPHOTERIC METAL

[75] Inventor: Frank A. Mauceri, Clarendon Hills, Ill.

[73] Assignee: Nalco Chemical Company, Oak Brook, Ill.

[22] Filed: Aug. 30, 1976

[21] Appl. No.: 719,014

[52] U.S. Cl. .................................. 210/43; 210/52; 252/329; 252/344
[51] Int. Cl.$^2$ ..................................... B01D 17/04
[58] Field of Search ................. 210/43, 52–54; 252/329, 340–345

[56] References Cited

UNITED STATES PATENTS

| 2,615,852 | 10/1952 | Kocher | 252/329 |
|---|---|---|---|
| 2,915,476 | 12/1959 | Shen | 252/341 |
| 3,585,148 | 6/1971 | Sackis | 252/341 |
| 3,691,086 | 9/1972 | Lees et al. | 210/53 |

Primary Examiner—Thomas G. Wyse
Attorney, Agent, or Firm—John G. Premo; Robert A. Miller; Barry W. Sufrin

[57] ABSTRACT

2.0 to 20,000 ppm of a composition comprising 15–50% by weight of a water soluble salt of an amphoteric metal and from 1.0 to 15% by weight of a water soluble cationic vinyl addition terpolymer said terpolymer containing prior to polymerization 5–40% by weight of a diallyl dimethyl ammonium halide, 5–75% by weight N-vinyl-2-pyrrolidone and 10–60% by weight of acrylamide or methacrylamide has been found to be an effective oil-in-water emulsion breaker. The above composition when added to the oily waste water will neutralize the negatively charged water particles and form an easily recoverable floc containing the oil.

8 Claims, No Drawings

PROCESS FOR RESOLVING OIL-IN-WATER EMULSIONS BY THE USE OF A CATIONIC POLYMER AND THE WATER SOLUBLE SALT OF AN AMPHOTERIC METAL

INTRODUCTION

This invention involves a method for the removal of emulsified oils from oily waste water. Oily based materials are used in a variety of industrial operations for a variety of purposes. Among the uses to which oily based materials are put to include but are not limited to metal working additives, lubricants, soaps, cleaners and hydraulic fluids. Often these oily substances will find their way into a plants aqueous waste stream and become emulsified in this system due to various additives which may be present and often times agitation or mixing in the waste stream.

Before being discharged into rivers or streams, waste streams contaminated with the oil must have the oil removed to an acceptable level so as not to cause environmental damage to the surrounding area. Where the oil is not emulsified, it, of course, may be skimmed off with relatively simple equipment. However, when the oil has become entrained or emulsified in the waste water, chemical treatment is often resorted to so as to remove this material.

A typical method for the removal of oil from oily waste water involves the treatment of the oily waste with an inorganic acid and an inorganic coagulant. Generally, an inorganic acid such as sulfuric acid would be added to the aqueous oily waste to lower the pH in the range of 1-3. Then from 1,000-5,000 ppm (depending on the oil content of the stream) of an inorganic coagulant such as aluminum sulfate would be added to coagulate the oil. This process involves the use of excessive amounts of acid and inorganic coagulant, the result of which can be undesirable pollution effects when the waste stream is discharged into a waterway.

Chemical treatments have also been proposed and used using cationic condensation polymers in combination with the inorganic coagulants mentioned above. While sometimes it is more efficient to use the inorganic coagulant alone, it would be a highly desirable advantage to the art if an inexpensive highly effective chemical additive could be prepared which would enable the oil content of waste streams to be reduced to below 50 ppm when employed in conventional equipment used to remove this oil without the need for excessive amounts of acid or inorganic coagulant.

While different cationic polymers have been employed in the past to neutralize the negatively charged oil droplets, not all cationic polymers have been found active for this purpose. Additionally, with some molecules, such as that in the instant application, little or nor activity is observed when the cationic polymer is added to the water followed by the inorganic coagulant. It has been found, however, that surprising emulsion breaking activity results if a composition is prepared containing the terpolymer of this invention with the water soluble salt of an amphoteric metal, whereby, both can be added at the same time to secure satisfactory emulsion breaking results.

OBJECTS

It is, therefore, an object of this invention to provide to the art an improved method for the resolution of oil-in-water emulsions and the recovery of oil from industrial plant effluents.

A further object of this invention is to provide to the art a method for the removal of oils from oily waste water using a composition comprising a terpolymer of acrylamide, diallyl dimethyl ammonium chloride, and N-vinyl-2-pyrrolidone and the water soluble salt of an amphoteric metal.

A still further object of this invention is to provide to the art a method for the removal of emulsified oils from oily waste water by treating the oily waste water with a composition comprising:
1. 15–50% by weight of a water soluble salt of an amphoteric metal;
2. 1.0–15% by weight of a water soluble cationic terpolymer said terpolymer containing prior to polymerization:
   a. 5–40% by weight of diallyl dimethyl ammonium chloride;
   b. 5–70% by weight N-vinyl-2-pyrrolidone;
   c. 10–60% acrylamide, said terpolymer having a molecular weight range of from 5,000 to 300,000;
3. 35–84% water, whereby, a floc containing said oil is formed.

Further objects will appear hereinafter.

THE INVENTION

This invention involves a method for the removal of emulsified oils from waste water. The waste water will generally contain 1.0–100,000 ppm by weight of oil. The removal being performed by the following steps:
1. Maintaining the pH of the waste water below 10.0;
2. Adding to the waste water with agitation from 2.0–20,000 ppm of an aqueous composition comprising:
   a. 15–50% by weight of a water soluble salt of an amphoteric metal;
   b. 1.0–15% by weight of a water soluble cationic terpolymer, said terpolymer containing prior to polymerization:
      1. 5–40% by weight of diallyl dimethyl ammonium chloride;
      2. 5–70% by weight N-vinyl-2-pyrrolidone;
      3. 10–60% acrylamide, said terpolymer having a molecular weight range of from 5,000 to 300,000;
   c. 35–84% water, whereby, a floc containing said oil is formed; and then,
3. Recovering said floc.

Preferably, the composition of this invention will comprise:
1. 20–40% by weight of the water soluble salt of the amphoteric metal;
2. 1.0–10.0% by weight of the water soluble cationic terpolymer; and
3. 50.0–79.0% by weight water.

The first step of this invention involves the maintaining of the pH of the oily waste water below 10.0. Preferably, the pH of the oily waste water should be adjusted to within the range of 7.0 to 9.5. While often times waste waters will have a pH within this range and no adjustment or further action need be taken, strongly alkaline waste water should have its pH lowered to the ranges stated above with an inorganic acid. Any inorganic acid may be used in this pH adjustment step. Typical inorganic acids utilized in this invention are sulfuric acid, hydrochloric acid, nitric acid, phosphoric acid, and phosphorus acid. The preferred acid used is sulfuric acid.

Once the pH of the oily waste water has been adjusted or maintained below 10.0 as described above, the oily waste water is treated with from 2 to 20,000 ppm of the composition of this invention, usually with agitation.

After the composition of the instant invention is added to the oily waste water, the waste water is agitated and then allowed to settle. A floc will form and depending on the concentration of oil and the water soluble salt of the amphoteric metal employed, the floc will either float to the surface or sink to the bottom of the tank or container being used, thereby, allowing the waste water, now less its oil content, to be removed. Additionally, the oil in the floc can generally be recovered by acidifying the floc, and then treating it with a water-in-oil emulsion breaker.

The mechanism involved in the invention in the treatment of oily wastes using the cationic polymer and inorganic coagulant is described as follows. The surface of the oil particles in the waste are negatively charged and are completely surrounded by a layer of lesser positive charges. The result of this is that the surrounding oil particle has a net negative charge. The resulting electric double layer can be measured as a so-called Zeta potential which is defined as the amount of charge to neutralize this net negative charge. This charged double layer, which has a net negative charge, gives rise to a repulsive force between neighboring oil droplets and prevents the oil droplets from coalescing. A strongly cationic charged molecule such as the polyacrylamide of our invention neutralizes the electric double charge and allows coalescence. The addition of the cationic polymer to the oily waste reduces the Zeta potential to the null point, in other words a net neutral charge.

Once the null point is reached, the inorganic coagulant is required to complete the removal of the oil. In the case where magnesium chloride is used this is accomplished by the formation of $Mg(OH)_2$ floc that sweeps and absorbs the neutralized oil droplets from the water.

When the null point is not reached, by the addition of a cationic polymer, massive amounts of inorganic coagulant are needed to achieve clarity. Thus this invention teaches a process for reducing the inorganic coagulant requirement in order to remove oil from oily waste.

Once the flocculation has taken place, any known method for removal of floc may be used. The suspended solids in the liquid effluent settle out very easily by gravity separation as well as other more sophisticated methods of separation such as centrifugation and filtration.

It is pointed out again that depending upon the amount of oil entrained within the floc, the floc may float or settle to the bottom. This will also depend on the particular amphoteric metal salt employed.

In general most governmental standards require that the amount of oil in oily waste be reduced to below 25 parts per million before discharge into any river, lake, or stream. The use of the process taught in this invention can often reduce the amount of oil in waste water to be disclosed to this level or less.

THE COMPOSITION

The composition useful for the recovery of oil from oily waste mixtures within the course of this invention contains two components, the water soluble salt of an amphoteric metal and a cationic terpolymer of acrylamide, N-vinyl-2-pyrrolidone and diallyl dimethyl ammonium chloride.

WATER SOLUBLE SALT OF AN AMPHOTERIC METAL

The water soluble salt of an amphoteric metal or inorganic coagulants which are used in the composition of this invention, are generally the water soluble salts of aluminum, magnesium, zinc and iron. Useful compounds would be sulfate, nitrates, halides, and phosphates. The preferred compounds useful in this invention are aluminum sulfate, magnesium chloride, zinc chloride, and ferric chloride. Other useful inorganic coagulants include ferric sulfate and aluminum chloride. These water soluble salts when employed in this invention are generally made up as aqueous solutions containing from 10-90% by weight. Since it is advantageous to use only the amount of water necessary to dissolve the salt, solutions are generally prepared in concentrate form, and 50% by weight solutions of these metal salts are routinely employed.

THE TERPOLYMER

The terpolymer of the instant invention is prepared by polymerizing together 5-40% by weight of diallyl dimethyl ammonium chloride, 5-70% by weight of N-vinyl-2-pyrrolidone and 10-60% by weight acrylamide. Well known solution polymer techniques are employed with the resultant polymer generally having a molecular weight of from 5,000 to 300,000 and preferably from 100,000 to 200,000. Due to the viscosity of the resultant solution polymer, it is generally handled as a dilute solution althought it may be polymerized in a more concentrate form and then diluted to the desired level for inclusion in the composition of the instant invention.

In the preferred practice of this invention, the terpolymer employed will contain from 15-35% diallyl dimethyl ammonium chloride, 30-50% N-vinyl-2-pyrrolidone and 20-50% acrylamide. Most preferably, a polymer composition containing approximately 25% diallyl dimethyl ammonium chloride, 40% N-vinyl-2-pyrrolidone, and 35% acrylamide is preferred.

The terpolymer of the instant invention is generally polymerized using solution polymer techniques with water as the solvent. The monomer concentration will generally range from 5-40% by weight and most preferably from 10-30% by weight. Conventionally, free radical catalyst are employed, such as: peroxides; redox systems, especially sulfite-persulfate; and organic free radical initiators, such as azobisisobutyronitrile. The catalyst is generally added to the reaction vessel as a dilute solution in either water or a water soluble hydrocarbon liquid. The terpolymer of the instant invention may be prepared using conventional equipment for polymerization of this nature.

The polymerization itself is generally conducted at neutral pH values and at temperatures of from 25-90° C. Molecular weight obtained on the above terpolymer are generally low to moderate ranging from several thousands to 300,000.

FORMULATION OF THE COMPOSITION

The composition of this invention is prepared by simply blending together a 5-40% by weight aqueous solution of the terpolymer with an aqueous solution of the water soluble salt of the amphoteric metal employed. Generally, the composition should be formulated so that it contains 15–50% by weight of a water soluble salt of an amphoteric metal, and 1.0–15% by weight of the water soluble cationic terpolymer described above. Preferably, the composition will contain 20–40% by weight of the water soluble salt of an amphoteric metal and 1.0–10% by weight of the water soluble cationic terpolymer with the remainder being water. The mixing of the two ingredients together can be done by simply blending the two ingredients together with agitation in a tank or other similar vessel. Since all of the components of this composition are water soluble, a homogeneous composition should result.

In order to further illustrate this invention, the following examples are presented:

EXAMPLE I

To a reactor equipped with stirrer, thermometer, reflux condenser, and addition funnel was charged 21.21 parts water, 3.30 parts acrylamide, 4.73 parts diallyl dimethyl ammonium chloride, 0.01 part of a 50% aqueous solution of sodium hydroxide (to a pH between 6.8–7.0), 4.07 parts of N-vinyl-2-pyrrolidone and 0.01 part of 37% hydrochloric acid to adjust the pH to between 6.9–7.1. This mixture was agitated.

To a second reactor was then charged 33% or 11 parts by weight of the monomer solution made up in the first reactor. 5.62 Parts by weight was then added with stirring, and the resultant solution was then purged with nitrogen for ½ hour. During this time, the reactor was heated to 140° F. At the end of one-half hour, a vacuum of 300 mm Hg was applied to the reactor and one-half of a solution prepared by mixing 1.99 parts by weight methyl alcohol with 0.09 part azobisisobutyronitrile was added to the reactor. An exothermic reaction resulted within approximately 2–5 minutes and the temperature was controlled at 145°–150° F by the application of vacuum for approximately ½ hour. At this point, the remainder of the catalyst solution was charged and the remaining two-thirds of the monomer solution from the first reactor was added at a constant rate over a period of 90 minutes. The reaction temperature was held at between 145°–150° F again using vacuum. The monomer solution was held at this temperature for an additional 3 hours at which time 58.97 parts water preheated to 140° F was added to the reactor. The resultant polymeric material contained approximately 12.1% polymer, was tinted slightly yellow, and was a moderately viscous polymer solution.

EXAMPLE II 1,791 Pounds of the composition prepared in Example 1 was added to a blending tank. 3,583 Pounds of a 50% solution of zinc chloride was then added with mixing followed by 71.5 gallons of water. The resultant solution was a homogeneous mixture of polymer and zinc chloride. This material is denoted as Example 2 and was saved for further use.

EXAMPLE III

The composition of Example 2 was tested in the breaking of an oily waste emulsion obtained from the washing, servicing and lubrication of diesel transportation equipped from a facility in the mid-west. With a jar test in which a given dosage of the product is added based on the amount of emulsion being treated, the use of the polymer, zinc chloride, and composition of this invention were investigated. Results are reported in Table I below.

TABLE I

| Dosage (ppm) | Ex. 1 | 50% Zn Cl₂ | Ex. II |
|---|---|---|---|
| 25 | Very hazy | Very hazy | Hazy |
| 50 | Very hazy | Very hazy | Hazy |
| 75 | Very hazy | Very hazy | Slight hazy |
| 100 | Very hazy | Hazy | Clear |
| 200 | Very hazy | Hazy | Sparkling |

As the results indicate, while neither the polymer or zinc chloride by itself will enable one to obtain clarified water from these wastes, the combination of the two ingredients produces results unobtainable from the use of either ingredient singularly.

EXAMPLE IV

The composition of Example 2 was tested in the breaking of an emulsion obtained from a refinery located in a coastal Louisiana city. At dosages between 25 and 70 ppm with pH adjustment of waste water of from 9–10, excellent results were obtained characterized by excellent water clarity and the formation of a light sinking floc.

EXAMPLE V

The composition of Example 2 was tested on emulsions obtained in a railroad servicing, fueling and washing facility.

The use of the composition of the instant invention yielded the most effective chemical treatment found in the water and produced the clearest water over the widest dosage range when compared against three other commercially available emulsion breaking treatments.

While the above examples utilize zinc chloride, it should be pointed out that the other amphoteric metal salts can be substituted. Especially useful is magnesium chloride which is non-polluting as compared to zinc and which can be readily substituted for in the above example.

Having thus described my invention, I claim:

1. A process for the removal of emulsified oils from waste water, said oily waste water containing from 1.0–100,000 ppm by weight of said oil, the removal being performed by the following steps:
    A. Maintaining the pH of the waste water below 10.0;
    B. Adding to the waste water with agitation from 2.0–20,000 ppm of an aqueous composition comprising:
      1. 15–50% by weight of a water soluble salt of an amphoteric metal;
      2. 1.0–15% by weight of a water soluble cationic terpolymer containing prior to polymerization:
         a. 5–40% by weight of diallyl dimethyl ammonium chloride;
         b. 5–70% by weight N-vinyl-2-pyrrolidone;
         c. 10–60% acrylamide, said terpolymer having a molecular weight of from 5,000 to 300,000;
      3. 35–84% water, whereby, a floc containing said oil is formed; and then,
    C. Recovering said floc.

2. The process of claim 1 wherein the pH of the oily waste water is maintained between 5.0–9.5.

3. The process of claim 1 wherein the water soluble salt of an amphoteric metal is from the group consisting of magnesium chloride, zinc chloride, aluminum chloride, aluminum sulfate, ferric sulfate, and ferric chloride.

4. The process of claim 1 wherein the aqueous composition contains:
   A. 20–40% by weight of the water soluble salt of the amphoteric metal;
   B. 1.0–10.0% by weight of the water soluble cationic terpolymer; and,
   C. 50.0–79.0% by weight water.

5. The process of claim 4 wherein the water soluble cationic terpolymer contains as monomer units:
   A. 15–35% diallyl dimethyl ammonium chloride;
   B. 30–50% N-vinyl-2-pyrrolidone; and,
   C. 20–50% acrylamide.

6. The process of claim 1 wherein the water soluble salt of an amphoteric metal is $MgCl_2$.

7. The process of claim 1 wherein the water soluble salt of an amphoteric metal is $ZnCl_2$.

8. The process of claim 1 wherein the polymer has a molecular weight of from 100,000–200,000.

* * * * *